United States Patent Office 3,048,492
Patented Aug. 7, 1962

3,048,492
PROCESS FOR FLAVOR ENHANCEMENT FOR LEGUMINOUS FOODS
Richard R. Barton, Clifton, N.J., assignor to Miles Laboratories, Inc., Elkhart, Ind., a corporation of Indiana
No Drawing. Filed June 9, 1960, Ser. No. 34,884
3 Claims. (Cl. 99—140)

This invention relates to a method for enhancing the flavor of processed leguminous food materials. Particularly the invention relates to a method for improving the flavor of processed leguminous foods by treatment of said processed foods with an enzyme preparation obtained from a source which is foreign to the processed food materials.

It has been found and is the object of this invention, that processed leguminous food materials which have lost a considerable amount of their flavor due to the processing steps may be improved in flavor by treatment with an oxidative enzyme in a concentration which is sufficient to materially elevate the carbonyl content of said food materials. It is believed that the measure of the carbonyl content is a measure of the flavor precursors present in foods and that the action of the oxidative enzyme is to increase the amount of flavor components present.

Although, at higher carbonyl levels there is not an exact correlation between carbonyl content and flavor, it has been established that at lower carbonyl content levels the flavor of cooked, processed leguminous food materials is unsatisfactory and that as the carbonyl concentration increases the flavor is enhanced.

The oxidative enzyme materials which are utilized in the process of this invention may be obtained from microbial or vegetative sources. One such enzyme preparation, which represents the preferred embodiment of this invention, is prepared in accordance with the following procedure:

Cells of *Micrococcus lysodeikticus* are prepared and harvested in accordance with the procedure described in U.S. Serial No. 623,530, filed November 21, 1956, for Roland F. Beers.

A suspension of the harvested cells in a solution of 0.5% sodium chloride is lysed at a pH of 7.0 at a temperature of 35° C. using 1.5%, based on the weight of the cells, of powdered eggwhites as a lysing agent.

After lysis is complete there is added to the mixture 40–50% by volume of 95% ethanol and sodium chloride to 1% on a volume basis. The mixture is filtered to remove cell debris and precipitated proteinaceous material and there is then added 73% by volume of 95% ethanol to precipitate the enzyme materials. The precipitate is then washed with additional ethanol until dehydrated and is dried and ground to a fine powder.

Another operable enzyme preparation which has utility in the process of this invention is prepared from a vegetable source such as various bean seeds and related materials. For example, the enzyme can be found in pea beans, red kidney beans, lima beans, great northern beans, blackeye beans, pinto beans, jumbo marrow beans, California pink beans, whole dried peas, yellow split peas, green split peas, lentils, Bountiful bush beans, Topcrop bush beans, Long Tendergreen beans, Alderman green sweet peas, Oneida green sweet peas, Cherokee yellow wax beans and soybeans.

An example of the preferred method for the extraction and preparation of the enzyme is described below:

1000 g. of finely ground blackeye beans were suspended in 3000 ml. of water and the mixture held at 25° C. for 30 minutes with constant stirring. The coarse sediment was removed by filtration through cheesecloth and the filtrate centrifuged to remove finely suspended material. This clarified filtrate (1570 ml.) was added slowly to three volumes (4710 ml.) of cold acetone with constant stirring. The wet precipitate was separated from the supernatant by filtration and then washed three times with fresh acetone. After air dying overnight, 63 g. of a fine, cream colored precipitate was obtained.

As stated above, the flavor of processed leguminous foods and food materials prepared from processed legumes are enhanced in their flavor by the inventive process. These food materials include green beans, wax beans, lima beans, peas, lentils and the like, which have been processed by dehydration, freezing, canning, etc. Food materials prepared from these processed foods such as soups, soup stocks in powdered or dehydrated form may also be improved in flavor by the process of this invention.

The processed foods after preliminary preparation such as thawing, hydration and the like are then prepared in accordance with the ordinary techniques. The desired amounts of the enzyme preparation is then added to the prepared foods in an amount varying between about 0.02 to 0.08% by weight and heated for a period of time between about 5 and 20 minutes at a temperature within a range of about 20 to 40° C. It will be understood, of course, that the amount of the enzyme preparation and the time and temperature of heating will depend upon the particular enzyme material and the substrate used; that is to say, the type of processed leguminous food being prepared.

As was stated above, it has been found that within certain ranges there is a correlation between flavor improvement as measured by organoleptic evaluation and increased carbonyl content of processed leguminous materials. This correlation has been established by measuring the increased carbonyl content of the treated leguminous materials and subjecting the cooked, treated foods to a taste panel which rated the treated foods on a hedonistic scale with a lower limit of 1 and an upper limit of 9. The taste panel consisted of 6–10 persons having training in organoleptic procedures.

The procedure for the determination of the carbonyl concentration was as follows:

50 g. of the treated material was diluted with 3 volumes of water and adjusted to pH 6, in a distillation flask. The material was then vacuum distilled and 50 ml. of distillate was collected under distilled water at 4° C. in two traps connected in series. The combined distillates were extracted with 200 ml. of ethyl ether in a separatory funnel. After removing the layers, the ether was evaporated at 43° C. The residue was brought to a volume of 10 ml. with carbonyl free methanol. Carbonyl determinations were made on this material using 2,4-dinitrophenyl hydrazine according to the procedure of Lappin and Clark as reported in the article entitled "Colorimetric Method for Determination of Traces of Carbonyl Compounds," Anal. Chem., 23, 541 (1951).

To more explicitly describe the process of this invention, the following examples are submitted:

EXAMPLE I

Dehydrated green beans were reconstituted with water and were cooked by heating to 100° C. for 25 minutes. To the cooked green beans after cooling to the desired temperature, there was added sufficient hydrogen peroxide to insure an adequate supply of oxygen, namely 1 ml. of a 1% solution per 50 gm. of green beans. There was then added to the cooked green beans varying amounts of an enzyme preparation recovered from the cells of *Micrococcus lysodeikticus* in accordance with the technique described above. The enzyme was allowed to react for 15 minutes at 35° C. After removing sufficient material for the taste panel testing, carbonyl determinations were run on each sample. The results of these determinations are set out in Table I below:

*Table I*

ACTION OF FLAVOR ENZYME ON DEHYDRATED GREEN BEANS

| Enzyme Conc., percent | Carbonyl Conc.: Molar $CH_3CHO$ $(10^{-5})$ | Taste Panel Test Score |
|---|---|---|
| Control | 21.0 | 3.0 |
| 0.02 | 50.0 | 4.6 |
| 0.04 | 45.0 | 4.4 |
| 0.06 | 20.0 | 4.4 |
| 0.08 | 16.0 | 4.4 |

An examination of the data recorded in Table I above indicates that the carbonyl content increased with the lowest enzyme concentration and then decreased as the enzyme concentration increased. Taste panel test scores well with the carbonyl determinations at the lower enzyme levels. However, the taste panel was not able to distinguish flavor differences between samples treated with the higher enzyme levels.

EXAMPLE II

The procedure described in connection with Example I above was repeated using canned green beans.
The results of these tests are set out in Table II below:

*Table II*

ACTION OF FLAVOR ENZYME ON CANNED GREEN BEANS

| Enzyme Conc., percent | Carbonyl Conc.: Molar $CH_3CHO$ $(10^{-5})$ | Taste Panel Test Score |
|---|---|---|
| Control | 22.0 | 4.8 |
| 0.2 | 30.0 | 4.9 |
| 0.4 | 46.0 | 5.6 |
| 0.6 | 49.0 | 5.6 |
| 0.8 | 52.0 | 5.6 |

An examination of this data shows that the carbonyl content increased with enzyme concentration over the whole concentration range employed. While there was an improvement in acceptance by the test panel, it was unable to distinguish between samples treated with the higher enzyme levels.

EXAMPLE III

The procedure described in connection with Example I above was repeated using frozen green beans as a substrate. The data obtained are set out in Table III below:

*Table III*

ACTION OF FLAVOR ENZYME ON FROZEN GREEN BEANS

| Enzyme Conc., percent | Carbonyl Conc.: Molar $CH_3CHO$ $(10^{-5})$ | Taste Panel Test Score |
|---|---|---|
| Control | 2.0 | 4.5 |
| 0.2 | 5.0 | 4.9 |
| 0.4 | 21.0 | 5.0 |
| 0.6 | 24.0 | 5.2 |
| 0.8 | 11.0 | 5.6 |

These data show a definite improvement in flavor with increasing enzyme levels except for the highest enzyme concentration. Carbonyl concentration also increased with enzyme levels.

EXAMPLE IV

In this example frozen lima beans were used as the substrate. The data obtained are set out in Table IV below:

*Table IV*

ACTION OF FLAVOR ENZYME ON FROZEN LIMA BEANS

| Enzyme Conc., percent | Carbonyl Conc.: Molar $CH_3CHO$ $(10^{-5})$ | Taste Panel Test Score |
|---|---|---|
| Control | 38.0 | 3.8 |
| 0.2 | 45.0 | 4.5 |
| 0.4 | 77.0 | 4.2 |
| 0.6 | 34.0 | 4.7 |
| 0.8 | 35.0 | 5.1 |

These data show that at the lower enzyme levels the carbonyl concentrations increased sharply then decreased to a constant level with the higher enzyme concentration. Despite this drop in carbonyl concentration, flavor acceptance was improved over the entire range of enzyme levels.

EXAMPLE V

In this example dehydrated peas were used as a substrate and the data obtained are set out in Table V below:

*Table V*

ACTION OF FLAVOR ENZYME ON DEHYDRATED PEAS

| Enzyme Conc., percent | Carbonyl Conc.: Molar $CH_3CHO$ $(10^{-5})$ | Taste Panel Test Score |
|---|---|---|
| Control | 3.0 | 4.2 |
| 0.02 | 20.0 | 4.2 |
| 0.04 | 24.0 | 5.2 |
| 0.06 | 37.0 | 5.8 |
| 0.08 | 68.0 | 6.4 |

These data show a correlation between the flavor enhancement and the increase in the carbonyl concentration at all levels of the enzyme used.

Although the exact nature of the enzyme material which is responsible for the flavor enhancement shown above is not known, it has been established that the enzyme is an oxidative enzyme and that it is diphosphopyridine nucleotide dependent.

To show that the enzyme is oxidative by nature, canned green beans were thoroughly blended in a Waring Blendor. Since the blending operation incorporated a considerable quantity of air into the substrate, the material was deaerated. This deaerated substrate was then subjected to the action of 0.1% of the microbial enzyme described above at 35° C. for one minute. Other samples of the substrate were aerated by blowing with air, mixed with hydrogen peroxide, calcium peroxide, and urea-hydrogen peroxide and carbonyl determinations run. The data obtained on these preparations are set out in Table VI below:

*Table VI*

EFFECT OF OXYGEN SOURCE ON CARBONYL CONCENTRATION

| $O_2$ Source | Conc. (Percent) | Carbonyl Conc.: Molar $CH_3CHO$ $(10^{-5})$ |
|---|---|---|
| Control | | 2 |
| Air | (1) | 61 |
| Hydrogen Peroxide | 0.07 | 92 |
| Urea Hydro-peroxide | 0.05 | 18 |
| Do | 0.10 | 22 |
| Calcium Peroxide | 0.05 | 36 |
| Do | 0.10 | 22 |

[1] (Bubbled thru substrate.)

The peroxides present in the substrates can be considered as oxygen sources since the enzyme preparation contains catalase. The oxidative nature of the reaction is further demonstrated by the fact that where air was used as the oxygen source, good enzyme activity resulted.

The same deaerated substrate was mixed with 0.1% of a purified crystalline catalase preparation and heated to 35° C. for 15 minutes, with no source of oxygen, with added hydrogen peroxide and with air being bubbled through the substrate. Carbonyl determinations on these three samples were no better than the controlled sample given in Table VI above. These data indicate that the oxidative enzyme is not catalase.

To further elucidate the nature of the enzyme, the following experiment was run.

EXAMPLE VII

Two samples of the flavor enzyme, one labelled enzyme A, which exhibited fair activity, and another labelled enzyme B, which demonstrated fairly good activity, were blended with the deaerated green bean substrate described in Example VI above. 0.1% of the enzyme was incubated with the substrate at 35° C. for 15 minutes and carbonyl concentration determined. The results of these determinations are set out in Table VII below:

*Table VII*

EFFECT OF DPN [1] ON FLAVOR ENZYME ACTIVITY

| Enzyme Preparation | Ml. of 0.003 M DPN [1] per 50 ml. substrate | Carbonyl Conc.: Molar $CH_3CHO$ $(10^{-5})$ |
|---|---|---|
| Control | | 22 |
| A | 0 | 23 |
| A | 1 | 50 |
| B | 0 | 36 |
| B | 1 | 79 |

[1] Diphosphopyridine nucleotide.

These data indicate that the enzyme material is diphosphopyridine nucleotide linked since presence of this material more than doubled the activity of the enzyme.

EXAMPLE VIII

Using the deaerated green bean substrate of Example VI above, varying concentrations of the microbial enzyme were tested at various temperatures with respect to the carbonyl concentration increase. The substrates were held at the stated temperatures for 15 minutes after which time the carbonyl concentrations were measured in accordance with the procedures above. The results of these tests are set out in Table VIII below:

*Table VIII*

EFFECT OF FLAVOR ENZYME CONCENTRATION AND TEMPERATURE ON CARBONYL CONCENTRATION (GREEN BEANS)

[Molar $CH_3CHO$ $(10^{-5})$]

| Enzyme Conc. (Percent) | 25° C. | 30° C. | 35° C. |
|---|---|---|---|
| 0.01 | 10.0 | 15.0 | 29.0 |
| 0.02 | 20.0 | 25.0 | 43.0 |
| 0.03 | 25.0 | 40.0 | 60.0 |
| 0.04 | 35.0 | 82.0 | 100.0 |

An examination of these data show that over the enzyme concentrations employed the carbonyl content of the substrate increased almost linearly with concentrations of enzyme at 25° C. At 30° and 35° C. however, activity increased sharply with enzyme concentration.

EXAMPLE IX

The deaerated green bean substrate described above was used in this example to study the effect of hydrogen ion concentration. The enzyme concentration was 0.02% and the substrate-enzyme mixture incubated at 30° C. for 15 minutes. The substrate was adjusted to the desired pH with dilute sodium hydroxide or acetic acid.

The results of this study are shown in Table IX below:

*Table IX*

EFFECT OF pH ON THE ACTION OF THE FLAVOR ENZYME

| pH | Molar $CH_3CHO$ $(10^{-5})$ |
|---|---|
| 4.5 | 0.0 |
| 5.0 | 1.2 |
| 5.5 | 2.2 |
| 6.0 | 6.2 |
| 6.5 | 7.4 |
| 7.0 | 12.2 |
| 7.5 | 16.5 |
| 8.0 | 18.3 |

As can be seen, enzyme activity is dependent upon the pH and the optimum pH level was not found in the range examined. The study was not extended further since higher pH levels would be beyond the range found in most food stuffs.

The enzyme preparation from *Micrococcus lysodeikticus* as prepared by the procedure described above contains predominantly catalase but also contains a number of other enzymes. It is known that catalase is not the flavor enzyme since pure catalase preparations do not give the flavor enhancement desired. This is shown by the following example:

EXAMPLE X

A sample of liver catalase was tested to determine if it could enhance the flavor of canned green beans. The same testing procedure as described in Example I was used with the following results:

*Table X*

THE ACTION OF PURIFIED LIVER CATALASE ON THE CARBONYL CONTENT OF CANNED GREEN BEANS

| Enzyme conc. (percent) | Carbonyl concentration Molar $CH_3CHO$ $(10^{-5})$ |
|---|---|
| 0 | 0 |
| 0.02 | 0 |
| 0.04 | 0 |
| 0.06 | 0 |

It is evident from this that liver catalase cannot be used to enhance the flavor of green beans.

To summarize briefly, the instant invention relates to a process for the enhancement of flavor of leguminous food materials which have been processed for storage and thus have decreased in flavor levels. The process comprises the steps of treating such materials with a concentration of an oxidative enzyme derived from microbial or vegetative sources which are foreign to said leguminous materials in a concentration which is sufficient to substantially increase the carbonyl content of said treated leguminous food materials. The oxidative enzyme materials may be obtained from the cells of *Micrococcus lysodeikticus*, as an example of microbial origin, or from bean seeds as an example of vegetative origin. The amount of enzyme material may vary between 0.02 and about 0.08% by weight depending both upon the origin of the enzyme and the substrate chosen.

What is claimed is:

1. A process for the enhancement of the flavor of leguminous food materials which comprises treating said materials with from about 0.02 to about 0.08% by weight of an oxidative enzyme selected from the group consisting of microbial and vegetative origin to produce maximum carbonyl content in said treated food materials.

2. A process according to claim 1 wherein said oxidative enzyme is recovered from the cells of *Micrococcus lysodeikticus*.

3. A process according to claim 1 wherein said oxidative enzyme is recovered from pulped bean seeds.

No references cited.